(12) United States Patent
Nourian

(10) Patent No.: US 8,857,729 B2
(45) Date of Patent: Oct. 14, 2014

(54) SPRINKLER CANISTER SEAL

(75) Inventor: Daniel Nourian, Reedley, CA (US)

(73) Assignee: National Diversified Sales, Inc., Fresno, CA (US)

( * ) Notice: Subject to any disclaimer, the term of this patent is extended or adjusted under 35 U.S.C. 154(b) by 570 days.

(21) Appl. No.: 13/090,938

(22) Filed: Apr. 20, 2011

(65) Prior Publication Data

US 2012/0266971 A1    Oct. 25, 2012

(51) Int. Cl.
  *B05B 17/00*    (2006.01)
(52) U.S. Cl.
  USPC ............ 239/1; 239/201; 239/203; 239/204; 239/237; 239/289; 239/580; 239/600; 277/435; 215/44; 215/356; 138/89
(58) Field of Classification Search
  USPC .............. 239/203–206, 230, 237, 289, 600, 239/288–288.5, 1, 201, 580; 277/434, 435, 277/446; 215/43, 44, 356; 220/288; 137/15.08; 138/89
  See application file for complete search history.

(56) References Cited

U.S. PATENT DOCUMENTS

| | | | |
|---|---|---|---|
| 2,519,805 A | | 8/1950 | Wilkins |
| 2,962,185 A | * | 11/1960 | Starr et al. ............ 220/288 |
| 3,124,267 A | * | 3/1964 | Cetrone ............ 220/288 |
| 3,405,837 A | * | 10/1968 | Carpenter, Jr. ............ 220/288 |
| 3,876,155 A | | 4/1975 | Ruben |
| 3,885,743 A | | 5/1975 | Wake |
| 3,948,285 A | * | 4/1976 | Flynn ............ 239/230 |
| 4,081,171 A | | 3/1978 | Morgan et al. |
| 4,177,947 A | | 12/1979 | Menzel |
| 4,360,037 A | | 11/1982 | Kendall |
| 4,671,485 A | | 6/1987 | Saarem |
| 4,913,352 A | | 4/1990 | Witty et al. |
| 5,054,690 A | | 10/1991 | Olson |
| 5,163,618 A | * | 11/1992 | Cordua ............ 239/205 |
| 5,215,254 A | | 6/1993 | Haruch |
| 5,222,671 A | | 6/1993 | Smiley |
| 5,265,803 A | | 11/1993 | Thayer |
| 5,761,846 A | | 6/1998 | Marz |
| 5,779,148 A | | 7/1998 | Saarem et al. |
| 5,984,202 A | | 11/1999 | Byles |
| 5,996,608 A | | 12/1999 | Hunter et al. |
| 6,260,770 B1 | * | 7/2001 | Epstein et al. ............ 239/206 |
| 6,357,668 B1 | | 3/2002 | Doshay |
| 6,488,218 B1 | | 12/2002 | Townsend et al. |
| 6,575,307 B2 | | 6/2003 | Lockwood |
| 6,997,393 B1 | | 2/2006 | Angold et al. |
| 7,438,083 B2 | | 10/2008 | Feith |
| 7,628,910 B2 | | 12/2009 | Lockwood |
| 2006/0131220 A1 | | 6/2006 | Lockwood |
| 2007/0119974 A1 | | 5/2007 | Johnson |
| 2007/0194150 A1 | | 8/2007 | Ericksen et al. |
| 2007/0262168 A1 | | 11/2007 | Ericksen et al. |
| 2010/0163651 A1 | | 7/2010 | Feith et al. |
| 2010/0181388 A1 | | 7/2010 | Harrington |
| 2010/0200676 A1 | | 8/2010 | Allen et al. |

\* cited by examiner

*Primary Examiner* — Steven J Ganey
(74) *Attorney, Agent, or Firm* — Fulwider Patton LLP

(57) ABSTRACT

An irrigation sprinkler canister seal comprising a flanged screw having a threaded rod and a circular flange extending perpendicular to the rod. The seal further includes a plug piece having a threaded bore adapted to receive the threaded rod, and further including a continuous frusto-conical surface extending around an elongate axis of the plug piece, the frusto-conical surface being configured to form a circumferentially continuous fluid seal against a cylindrical rim of a cylindrical bore.

10 Claims, 7 Drawing Sheets

SPRINKLER CANISTER SEAL

BACKGROUND

The present invention relates to a device and method for sealing an irrigation sprinkler canister to prevent it from discharging water. Specifically, the invention relates to a device and method capable of sealing nearly all types of irrigation sprinkler canister that have been made presently available on the market.

In recent years, automatic irrigation sprinkler systems have been installed in many gardens and public spaces in the United States and other countries. During its time, the automatic irrigation sprinkler system has provided an extremely useful system for controlling the flow of water onto garden landscapes. A typical automatic irrigation sprinkler system is shown in FIG. 1 in exploded condition. It includes a canister that is planted permanently in the ground and is connected via a permanently fixed underground water conduit to a system (not shown) adapted to periodically supply water under pressure to the canister. A typical sprinkler canister includes a housing 102 that is connected to the water supply conduit 120. The housing is configured to be closed off by a cap 104. The cap removably holds within the housing a pop-up riser 122 that is biased to a downward position by a spring 124. A sprinkler nozzle 126 is positioned on top of the riser 122. Under the pressure of water from the supply conduit, the riser is forced upwardly against the bias of the spring to elevate through a hole in the cap to a few inches above the ground, and to discharge water by sprinkling from the nozzle until such time as the water supply is automatically closed off whereupon the riser sinks back into the housing and out of view under bias of the spring. A throat piece 106 is generally found in each typical canister, as described in more detail below. At the time this type of irrigation system was introduced onto the market, it represented a considerable advantage over the previously applied systems that included extending a movable hose above ground onto the landscape, and irrigating the landscape by manual control of the hose. Such manual irrigation was of course labor intensive, inflexible, costly to operate, and not at all frugal in the use of water. Accordingly, manual irrigation has been largely replaced with automatic sprinkler irrigation as a definite improvement over past systems.

However, with the passage of time, and despite the more economical water usage by automatic sprinkler irrigation systems, the demand for water for irrigation has increased dramatically, while the supply of water has remained substantially constant. Consequently, it has been determined that a system even more frugal in its consumption of water than automatic sprinkler irrigation is required today for irrigating garden landscapes. One such system that has been recently developed is the drip irrigation system, or a low flow irrigation system, in which "bubbler nozzles" are located strategically in a garden landscape, all nozzles being connected via conduit to a system that supplies water under pressure to the nozzles. Instead of sprinkling water through the air onto plants, a bubbler nozzle discharges a small amount of water directly at the root of a plant which then soaks into the soil, thereby being much more accurately delivered and losing much less water to evaporation and wind dispersion than water discharged through the air onto the leaves of a plant, or even nearby the plant on the ground, as is the case with sprinkler irrigation. One aspect of introducing such a drip irrigation system to replace a sprinkler irrigation system is that the drip system may conveniently tap into an existing water distribution network comprising water conduits buried underground that has been previously installed for use with a now defunct automatic sprinkler irrigation system. However, a drip system connected in this way requires all existing sprinkler canisters to be disabled so that they do not sprinkle water through the air according to the method of an irrigation sprinkler. Thus, as ever more automatic sprinkler irrigation systems are replaced with drip or low flow irrigation systems, an ever increasing number of irrigation sprinkler canisters will require to be disabled to make way for drip irrigation technology. At present, the typically preferred way to effectively disable a sprinkler canister is for the user to expose the canister by digging a hole in the ground around the canister, and to then remove the canister from its threaded connection to the conduit water distribution system, after which the user may apply a threaded cap to the exposed conduit to permanently seal it off. After doing so, the user will close the hole and bury the capped off conduit, while disposing of the canister or placing it in storage. Over the passage of time, the location of the capped off conduit will likely be forgotten. This method suffers from a first disadvantage that disabling the canister requires a substantial amount of work to excavate and remove the canister from the ground. A second disadvantage is that, while the canister is removed from its threaded connection to the conduit, earth may fall into the temporary opening in the distribution system while the canister is removed, and this is a well known source of blockages in a subsequent drip system. A third disadvantage is that the canister is permanently removed from the water distribution system and its connection point is forgotten. Thus, if ever its temporary usage is again required, it is difficult to reinstate.

Therefore, there is a need in the art for a system and method for disabling irrigation canisters that solves the problems in the prior art. The present invention addresses these and other needs.

SUMMARY OF THE INVENTION

The sprinkler canister seal of the present invention is especially adapted and sized to fit into and seal a wide range of irrigation sprinkler canisters that have previously been made presently available on the market, each one of which is dimensioned differently. Thus, the invention relates not merely to sealing off a sprinkler canister, but also to sealing off a large proportion of all sprinkler canisters that have been made presently available on the market, regardless of size, configuration, or manufacture. To this end, a large proportion of all sprinkler canisters that have been made presently available on the market have been studied and measured, with a view to carrying out the principle of the invention.

In one preferred aspect, the invention includes a sealing system for sealing an irrigation sprinkler canister, the sealing system comprising a flanged screw having a threaded rod and a circular flange extending perpendicular to the rod. A plug piece is provided, having a threaded bore adapted to receive the threaded rod. The plug piece further includes a continuous frusto-conical surface extending around an elongate axis of the plug piece, the frusto-conical surface being configured to form a circumferentially continuous fluid seal against a cylindrical rim of a cylindrical bore. In a preferred embodiment, the frusto-conical surface is formed from ABS (or generally, acrylonitrite butadiene styrene), and has a minor diameter and a major diameter, the minor diameter is between 0.5 inches and 0.7 inches, and the major diameter is between 0.9 inches and 1.1 inches. These dimensions ensure that the frusto-conical surface will seal against the throat piece of a large proportion of all the sprinkler irrigation canisters that have been made presently available on the market. Further preferably, the threaded rod has a diameter of less than 0.5 inches, which will ensure that the rod is small enough to fit into nearly any cap of an irrigation sprinkler that has been made presently available on the market.

In another preferred aspect, the invention includes a method for sealing an irrigation sprinkler canister that is connected to a conduit of a water distribution network. The method comprises removing, from an upper surface of the canister, a cap that is attached to the canister and configured to contain within the interior of the canister a pop-up riser, an associated biasing spring, and a throat piece defining a bore for receiving the pop-up riser. A further step includes removing, from the interior of the irrigation sprinkler canister, the pop-up riser, thereby exposing an opening in the cap. A threaded rod of a flanged screw is inserted through the opening, and thence through the bore of the throat piece. The threaded rod is then inserted into a threaded bore of a plug piece having a frusto-conical surface. The flanged screw is rotated into the threaded bore, thereby drawing the plug piece towards the flanged screw, toward the throat piece, and towards the cap. The flanged screw is further rotated in relation to the plug piece until the frusto-conical surface of the plug piece penetrates and seals the bore of the throat piece, and the cap and the throat piece are captured between the plug piece and a flange of the flanged screw. The plug piece is then inserted into the canister, and the cap is re-attached to the upper surface of the canister. Under this method, the canister is sealed off against water flow from the water distribution network. In a preferred aspect, the foregoing steps are performed without removing the canister from the conduit of the water distribution network. In yet a further preferred aspect, removing the pop-up riser includes removing the associated spring.

Thus, by following this device and method, it is possible to disable a large portion of all irrigation sprinklers that have been made available on the market, while leaving such sprinklers in the earth connected to a water distribution network.

These and other advantages of the invention will become more apparent from the following detailed description thereof and the accompanying exemplary drawings.

DETAILED DESCRIPTION OF THE PREFERRED EMBODIMENTS

Figure 1:
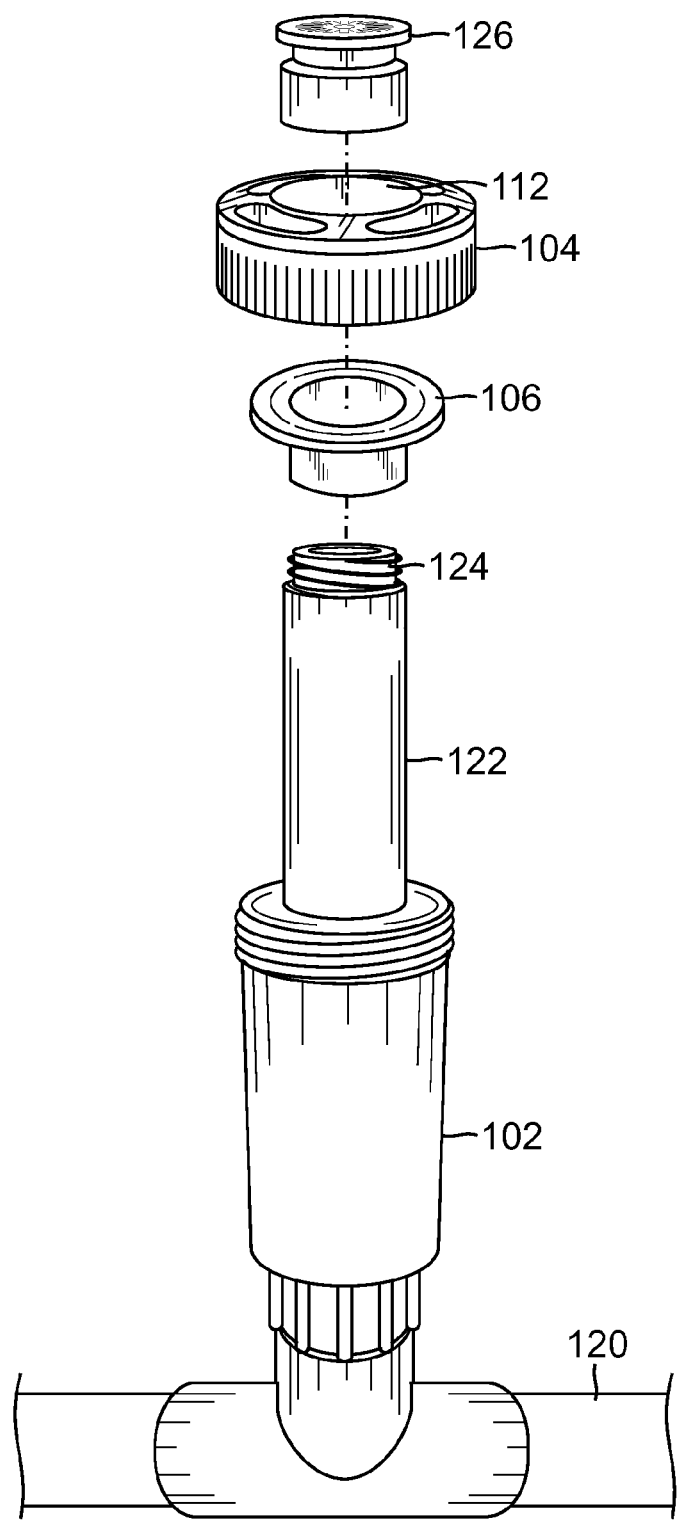
FIG. 1 is a perspective exploded view of a known sprinkler canister of a kind into which the seal of the present invention is configured to be inserted to seal the sprinkler canister.
Figure 2:
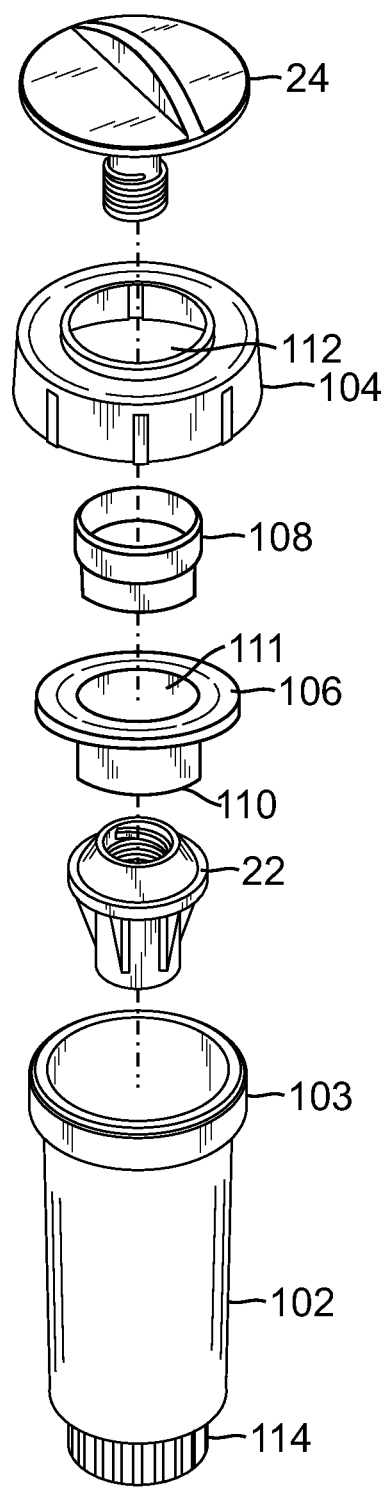
FIG. 2 is a perspective view of a sprinkler seal having features of the present invention in disassembled configuration, shown in combination with elements of a sprinkler canister also in disassembled configuration.

In order to practice the method of the present invention, a study has been conducted on a wide range of sprinkler canisters that have been made presently available on the market. As a result of this study, it has been ascertained that the majority of canisters presently available on the market include at least the following components, exemplified in FIGS. 1, 2, and 7. First, nearly every canister on the market includes a cylindrical housing 102 for enclosing some form of pop-up riser 122 that is spring biased 124 downwardly, but wherein the riser overcomes the downward bias and "pops up" when water pressure is applied to the interior of the canister. Second, nearly every canister on the market includes a removable cap 104, adapted to be removably connected to the housing 102. As indicated in FIG. 1, a threaded connection may be provided, or alternatively, as indicated in FIG. 2, the housing may have an external flange 103 that may be discontinuous around the circumference of the housing. In this configuration, the cap 104 may include an internal flange 105 that may also be discontinuous around the internal circumference of the cap, wherein the discontinuities of the housing flange and the cap flange permit the two flanges to pass through each other, whereafter rotation of the cap engages the two flanges to render the cap removably attached to the housing. The cap 104 defines an internal circular opening 112 which is sized to permit the pop up riser 122 to extend from and retract into the housing. Further, included in nearly every canister on the market is a throat piece 106. The throat piece, or a portion of the throat piece, is used in canisters found on the market to form a seal between the cap 104 and the housing 102 and is therefore formed of a flexible elastomeric material that is suitable for forming a seal interface. The seal formed by the throat piece 106 between cap 104 and housing 102 is best seen as exemplified in the sectional view of FIG. 7. Further, the throat piece is configured to stabilize the pop-up riser, which is sized to slide within a cylindrical bore 111 of the throat piece. The bore 111 of the throat piece terminates at a lower end in a circumferentially continuous rim 110.

As will be appreciated, because there are large number of sprinkler canister types on the market, each with its own dimensional and geometric configuration, any single device that is designed to be capable of sealing off a large proportion of such canister types must be capable of being adapted to a major portion of the different geometries of each sprinkler canister type. The present invention is a single system specially designed to achieve this objective. Thus, the invention relates not merely to sealing off a particular sprinkler canister type, but also to being capable of sealing off a large proportion of all canister types presently available on the market, regardless of the canister's size and shape.

Therefore, referring now to the drawings, there is shown and described a preferred embodiment of a sprinkler canister seal 20 that includes features of the present invention. In a first aspect of the invention, the canister seal includes a plug piece 22 which is adapted and sized to fit into a wide range of differently shaped irrigation sprinkler canisters that have previously been made available on the market. In order to insert the plug piece 22 into the canister, it is first necessary to remove from the canister its pop-up riser 122 and preferably also the spring 124 that biases the riser downwardly. These two items may be stored safely in the event that it is ever desired to restore the canister to operative condition as an irrigation sprinkler, because the method of the present invention contemplates that any step disabling the canister should be a fully reversible step. In a second aspect of the invention, the canister seal includes a flanged screw 24 whose purpose is to pull the plug piece 22 upwardly toward the flanged screw once the plug piece is installed inside the housing 102 of the canister.

Figure 3:
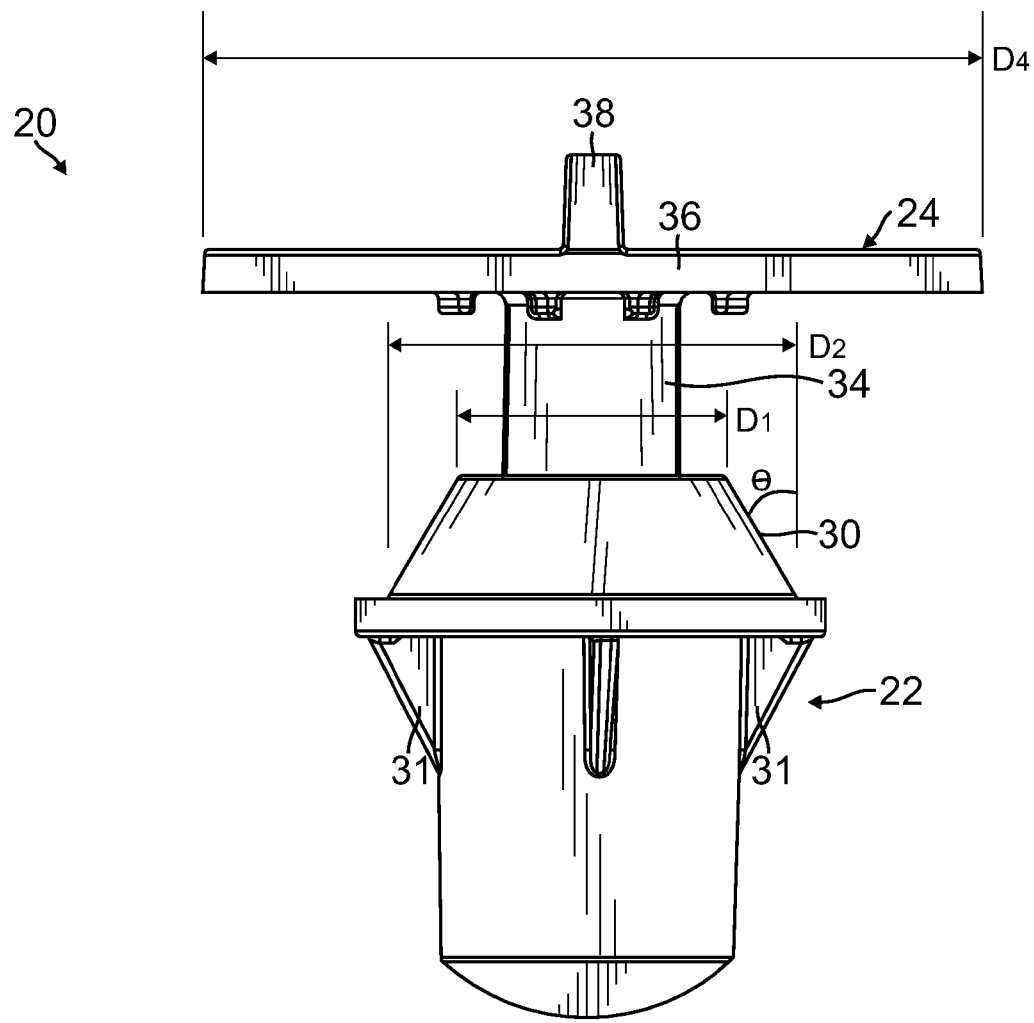
FIG. 3 is a front elevational view of a sprinkler seal having features of the present invention, in assembled condition.
Figure 4:
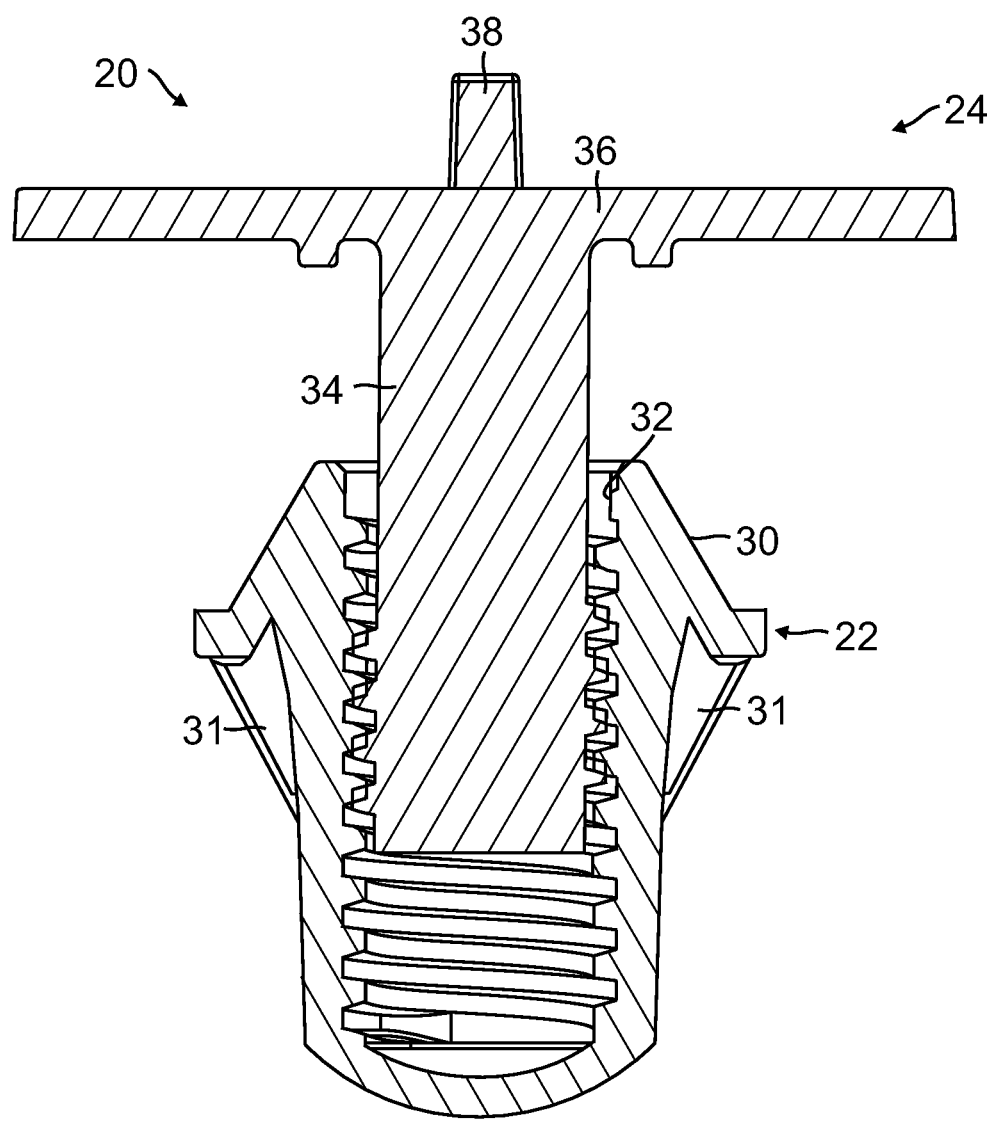
FIG. 4 is a sectional view of the sprinkler seal shown in FIG. 3.
Figure 5:
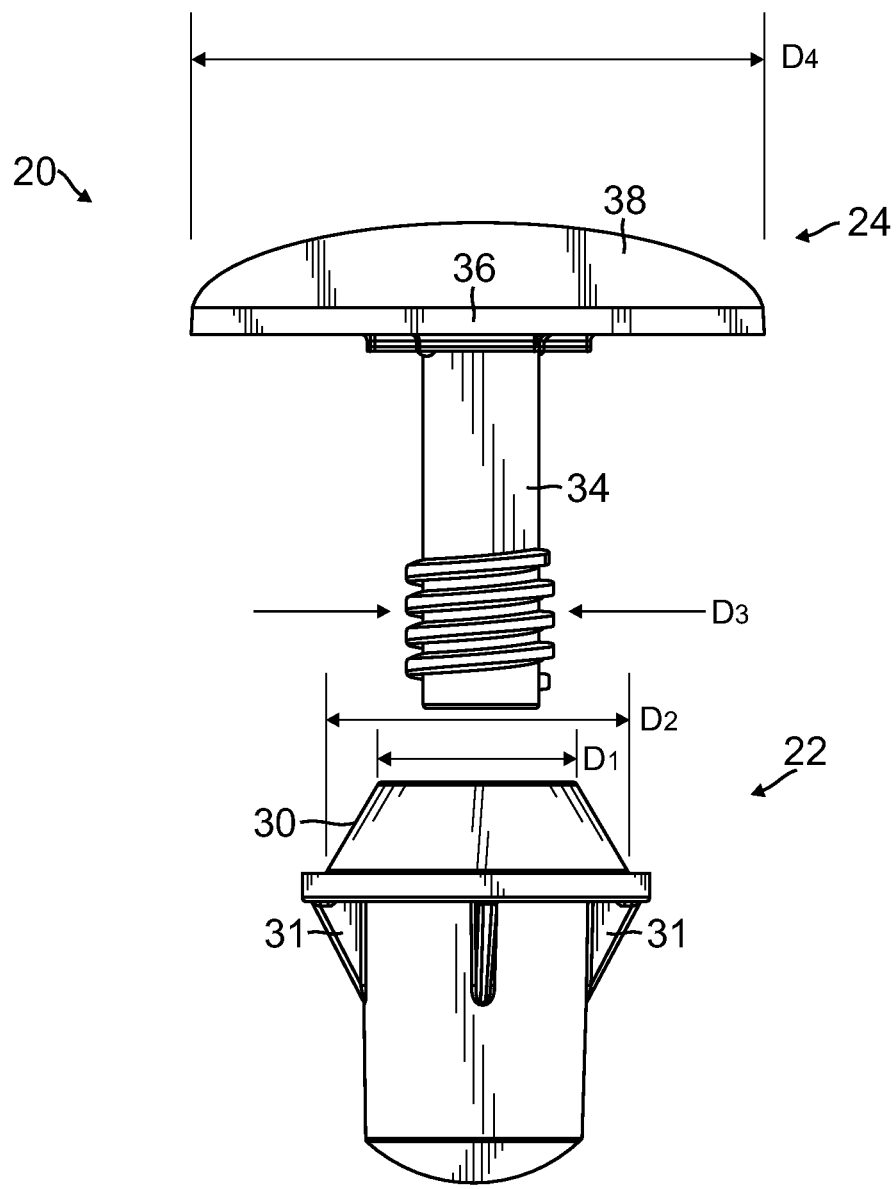
FIG. 5 is a front elevational view of the sprinkler seal shown in FIG. 3, in disassembled condition.
Figure 6:
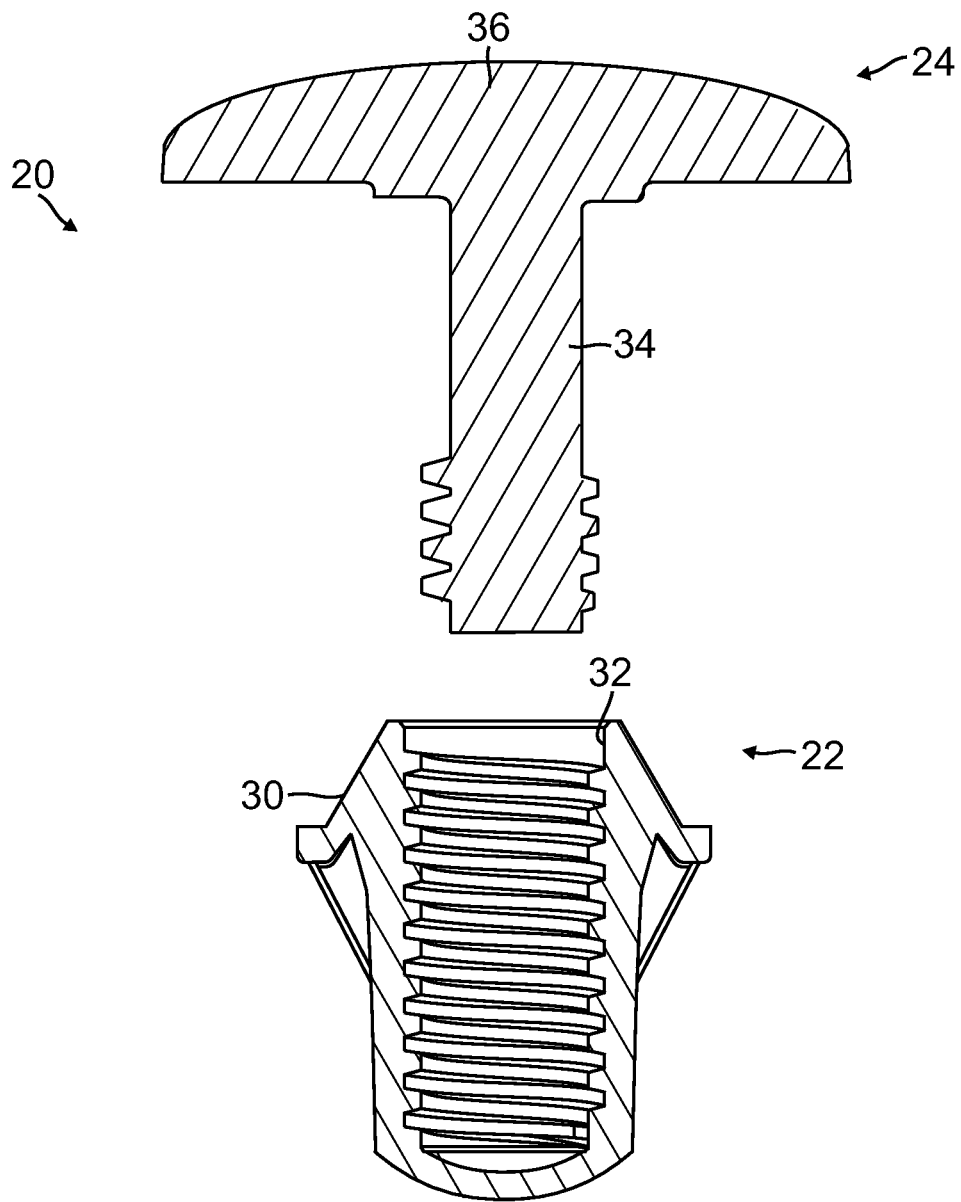
FIG. 6 is a sectional view of the sprinkler seal shown in FIG. 5.

As seen in the figures, the plug piece 22 includes a frusto-conical portion that defines a frusto-conical surface 30 extending symmetrically around the circumference of the plug piece and inclined at an angle θ to the vertical axis of the plug piece, the angle being preferably between 30 and 60 degrees. Consequently, the frusto-conical surface 30 has a minor diameter D1 at its upper end and a major diameter D2 at its lower end, as seen in FIGS. 3 and 5. Preferably, the minor diameter is between 0.5 inches and 0.7 inches, and the major diameter is between 0.9 inches and 1.1 inches for reasons stated below. Also preferably, the frusto-conical surface is formed of a flexible ABS or similar material, capable of slight deformation under pressure. By extension, the entire plug piece 22 is preferably mold cast as one piece from the same type of material. Further features of the plug piece 22 include an internal threaded bore 32, extending from the top of the plug piece downwardly along the central axis of the plug piece and adapted to receive a threaded rod 34 on the flanged screw 24. Further included on the plug piece are tabs 31 extending from the lower surface of the plug configured to facilitate a user to apply a rotational torque to the plug.

The flanged screw 24 is configured to engage with the plug piece 22 via threaded engagement between the threaded bore 32 of the plug piece, and the threaded rod 34 of the flanged screw. The flanged screw further includes a relatively broad flange 36 which may include finger tabs 38 configured to permit a user to apply rotational torque to the flanged screw 24. The outside diameter D4 of the flange 36 is preferably sufficient to securely span across the largest cap 104 on any of the commercially available sprinkler canisters presently available on the market, and in a preferred embodiment is not less than 2 inches.

The diameter D3 of the threaded rod 34 is preferably selected to be less than 0.5 inches, so that it will tend to pass through the smallest opening 112 of a cap 104 on any one of the commercially available sprinkler canisters presently available on the market. Further, the minor diameter D1 of the frusto-conical surface is selected with the dimensions as set forth above so that it will preferably engage with the smallest diameter of the throat piece 106 on any of the commercially available sprinkler canisters presently available on the market. And yet further, the major diameter D2 of the frusto-conical surface is selected with the dimensions set forth above so that it will preferably engage with the largest diameter of the throat piece 106 on any of the commercially available sprinkler canisters presently available on the market. It will be appreciated that the conical feature of the surface 30 adds mechanical advantage to its ability to provide a seal, as explained below.

Figure 7:
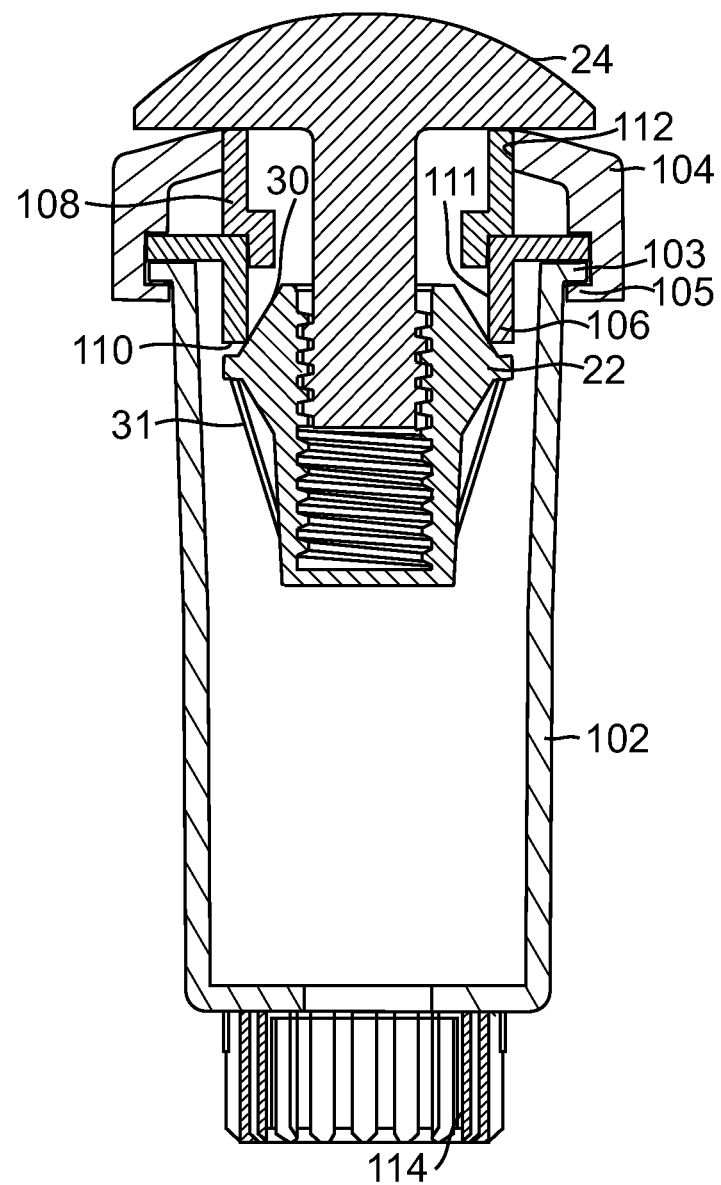
FIG. 7 is a sectional view of a sprinkler seal having features of the present invention shown, shown in conjunction with elements of a sprinkler canister to seal the canister against water flow.

In use, the irrigation canister seal 20 is applied as follows. The user approaches an existing irrigation sprinkler canister lodged in the earth that is connected to a conduit of a water distribution system, and clears away a few centimeters of earth surrounding the canister to expose the upper surface of the canister. Preferably, the user does not remove the canister seal from its connection to the conduit of a water distribution system, to conserve on the amount of work necessary to carry out the invention. Next, the upper cap 104 is removed from the housing 102 of the canister along with the pop up riser, the biasing spring, the throat piece 106 and any other portion of the interior of the housing. The pop up riser, and preferably the biasing spring, are discarded, while storing the same in the event it should be needed at a later date. Then, the threaded rod 34 of a flanged screw 36 is inserted through the opening 112 of the cap, the throat piece 106 is installed and any other portion required to complete a water tight fit such as flanged cylinder 108 over the threaded rod. Finally the plug piece 22 is installed on the tip of the threaded rod. By rotating the plug piece 22 in relation to the flanged screw 24, the plug piece 22 is drawn up towards the cap 104, and the conical surface 30 of the plug piece is compressed onto the bore of the throat piece to seal against the lower rim 110 of the throat piece 106 to form a circumferentially continuous and water tight seal against the throat piece as seen in FIG. 7. It will be appreciated that the conical aspect of the surface 30 provides a mechanical advantage, by which the tension force in the rod is leveraged to increase the radially outward force of the surface 30 against the rim 110 to form the seal. Then, the user holds the resulting assembly, including the cap 104, the throat piece 106, the plug piece 22, and the flanged screw 24, over the housing 102 of the canister, and he inserts the plug piece of the assembly into the housing 102. The internal flange of the cap 104 is engaged with the external flange of the housing 102, the cap is rotated to lock the cap onto the housing to reinstate the seal between the cap and the housing, and the canister is thereby sealed against water flow, as exemplified in FIG. 7, with an additional seal being formed between the plug piece 22 and the rim 110 of the throat piece 106.

The canister is thus taken out of service, but at a minimum its housing 102 and cap 104 are left in place in the earth connected to a conduit (not shown) in the water distribution network. Should it ever be desirable to reinstate a functioning irrigation sprinkler at that location, the reverse steps are easy to perform in order to reinstate an operable sprinkler.

Thus, the irrigation canister seal of the present invention provides a novel and advantageous structure for sealing off a large proportion of known irrigation sprinkler canisters, presently on the market, against water flow. The present invention may, of course, be carried out in other specific ways than those herein set forth without departing from the essential characteristics of the invention. The present embodiments are, therefore, to be considered in all respects as illustrative and not restrictive, while the scope of the invention is set forth in the claims that follow.

I claim:

1. A method of sealing an irrigation sprinkler canister that is connected to a conduit of a water distribution network, the method comprising:

removing, from an upper surface of the canister, a cap that is attached to the canister and configured to contain within the interior of the canister a pop-up riser, an associated biasing spring, and a throat piece defining a bore for receiving the pop-up riser;

removing the pop-up riser from the interior of the irrigation sprinkler canister, thereby exposing an opening in the cap;

inserting a threaded rod of a flanged screw through the opening, and thence through the bore of the throat piece;

inserting the threaded rod into a threaded bore of a plug piece having a frusto-conical surface;

rotating the flanged screw into the threaded bore, thereby drawing the plug piece towards the flanged screw, toward the throat piece, and towards the cap;

further rotating the flanged screw until the frusto-conical surface of the plug piece enters and seals the bore of the throat piece, and the cap and the throat piece are captured between the plug piece and a flange of the flanged screw;

inserting the plug piece into the canister; and re-attaching the cap to the upper surface of the canister to form a seal between the cap and the canister;

whereby, the canister is sealed off against water flow from the water distribution network.

2. The method of claim 1, wherein the steps of claim 6 are performed without removing the canister from the conduit of the water distribution network.

3. The method of claim 1, wherein removing the pop-up riser includes removing the associated spring.

4. A sealing system for sealing water flow from a water distribution network, the system comprising:
- a cylindrical canister having an opening defined by a circular edge in a surface of the canister, and further defining a circular rim in the interior of the canister;
- a flanged screw having an externally threaded rod and a flange extending perpendicular to the rod, the flange being sized to radially extend beyond the circular edge of the opening in the canister; and
- a plug piece having an internally threaded bore adapted to receive the threaded rod in a first end of the bore, the plug piece further defining a continuous frusto-conical external surface extending around an elongate axis of the plug piece, the frusto-conical surface being configured to form a circumferentially continuous fluid seal against the internal circular rim of the canister;
- wherein, the rod extends through the opening in the canister while the flange radially extends beyond the circular edge of the canister, and the rod is rotated within the internal thread of the bore, whereby the plug piece is drawn into contact with the internal circular rim to form a continuous fluid seal.

5. The sealing system of claim 4, wherein, the bore is sealed closed at a second end opposite the first end.

6. The sealing system of claim 4, wherein the frusto-conical surface is formed from ABS.

7. The sealing system of claim 4, wherein the frusto-conical surface has a minor diameter and a major diameter, the minor diameter being between 0.5 inches and 0.7 inches, and the major diameter being between 0.9 inches and 1.1 inches.

8. The sealing system of claim 4, wherein the threaded rod has a diameter of not more than 0.5 inches.

9. The sealing system of claim 4, wherein the frusto-conical surface extends at an angle of between 30 degrees and 60 degrees to an elongate axis of the plug piece.

10. The sealing system of claim 4, wherein the flange of the flanged screw has a diameter of not less than 2.0 inches.

* * * * *